Figure 1:
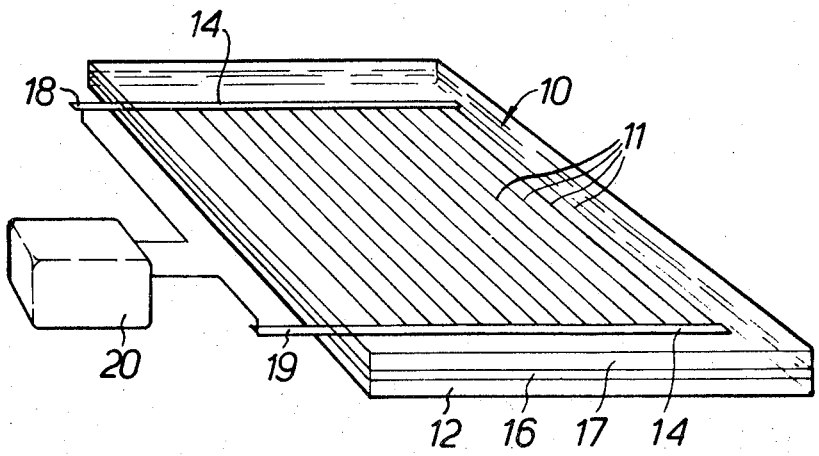

United States Patent

[11] 3,629,040

| [72] | Inventors | Brian J. Hinton |
| --- | --- | --- |
| | | Alvechurch; |
| | | Kenneth F. Kite, Birmingham, both of England |
| [21] | Appl. No. | 735,638 |
| [22] | Filed | June 10, 1968 |
| [45] | Patented | Dec. 21, 1971 |
| [73] | Assignee | Triplex Safety Glass Co., Ltd. London, England |
| [32] | Priority | June 9, 1967 |
| [33] | | Great Britain |
| [31] | | 26,707/67 |

[54] METHOD OF MAKING LAMINATED PANELS INCORPORATING HEATING WIRES
9 Claims, 2 Drawing Figs.

[52] U.S. Cl.................................... 156/275,
29/498, 29/611, 219/10.43
[51] Int. Cl..................................... H05b 3/18,
B29c 19/06
[50] Field of Search........................... 29/611,
471.1, 498, 502; 156/275, 327, 161; 161/199, 258;
117/128.4; 219/10.41, 10.43

[56] References Cited
UNITED STATES PATENTS

| 2,404,191 | 7/1946 | Quayle et al. ............... | 161/199 X |
| 2,831,792 | 4/1958 | Gaiser ......................... | 161/199 X |
| 3,111,570 | 11/1963 | Strang et al. ................ | 156/275 X |
| 3,378,919 | 4/1968 | Brittan ........................ | 29/611 |

OTHER REFERENCES
Soldering Manual, " American Welding Society," Pages 68– 76, 1959.

*Primary Examiner*—Carl D. Quarforth
*Assistant Examiner*—E. E. Lehmann
*Attorney*—Scrivener Parker Scrivener and Clarke

ABSTRACT: Method of making laminated panels incorporating heating wires including the steps of placing the heating wires on a first sheet, locating the wires in place with a layer of adhesive, placing two feed conductors across the heating wires and laminating the first sheet and a second sheet and the intermediate layer together, then applying electricity at high frequency between the two feed conductors so as to cause a good electrical connection to be formed between at least some of the heating wires and the feed conductors where a good electrical connection did not previously exist.

PATENTED DEC 21 1971 3,629,040

METHOD OF MAKING LAMINATED PANELS INCORPORATING HEATING WIRES

This invention relates to the manufacture of laminated panels incorporating heating wires and of the kind comprising first and second rigid sheets and an intermediate layer of a yielding material, the heating wires together with two associated feed conductors being disposed between the first sheet and said intermediate layer, and the heating wires extending in electrical parallel between the two feed conductors.

Laminated panels of this kind are well known; some are opaque but it is more usual for them to be transparent, in which case the rigid sheets may be made from glass and the intermediate layer from a plastic material. Transparent panels may, for example, be used as windscreens or other windowlights in motor vehicles and in aircraft. Panels of this kind may contain only three layers, that is the two rigid sheets and the intermediate layer, but they may contain more.

In making laminated panels of the kind referred to above it has often proved difficult to make satisfactory and reliable contact between the heating wires and the feed conductors, particularly when the wires and feed conductors are made from materials which cannot be soldered together or otherwise united by fusion. The difficulties are aggravated when very fine wires are used. It is an object of the invention to provide a method whereby more satisfactory and reliable contacts can be made.

From one aspect the present invention consists in a method of making a laminated panel incorporating heating wires and of the kind comprising first and second rigid sheets and an intermediate layer of a yielding material, the heating wires together with two associated feed conductors being disposed between the first sheet and said intermediate layer, and the heating wires extending in electrical parallel between the two feed conductors, which method includes the steps of placing the heating wires on the first sheet, locating the wires in place with a layer of adhesive, placing the two feed conductors across the heating wires and laminating the first and second sheets and the intermediate layer together, the method being characterized in that at some stage after the feed conductors have been placed across the heating wires electricity at high frequency is applied between the two feed conductors so as to cause a good electrical connection to be formed between at least some of the heating wires and the feed conductors where a good electrical connection did not previously exist.

From another aspect the present invention consists in a laminated panel made by the method outlined in the last preceding paragraph.

The step of applying electricity at high frequency may be effected either before or after the lamination of the panel, but is preferably effected after lamination.

When the feed conductors are placed across the heating wires there is, in theory at least, only the possibility of line contact between the feed conductors and the heating wires, and even this may be prevented initially by the presence of the adhesive. As the adhesive usually used is an electrical insulator this then prevents electrical contact between the feed conductors and the heating wires. In order to increase the area of contact between each feed conductor and each heating wire the feed conductors are preferably formed into arches over the heating wires. This is preferably effected before the application of electricity at high frequency. Arching of the feed conductors normally occurs, at least to some extent, during the lamination process, and this may be sufficient in some circumstances. It may be necessary or desirable, however, to form the arches, at least partially, before the lamination process. This may be done by passing a suitable tool along each of the feed conductors while pressure is applied to it. The tool may be unheated, but preferably the tool is heated to an extent such that the layer of adhesive between the heating wires and the feed conductors is at least partially dispersed by the combined effects of heat and pressure.

The feed conductors may be made from copper or other metal having a melting temperature which is relatively high in relation to the range of temperatures in which the adhesive can be caused to disperse. Alternatively the feed conductors may comprise copper or other metal strips of this kind coated with solder or the like metallic coating having a relatively low melting point as compared with those of the heating wires and the strips. When such coated feed conductors are used the solder or like coating is preferably caused to melt or soften so that its surface can be induced during manufacture to conform more closely than before to the shape of the wires over which the feed conductors extend. The solder or like coating may also adhere to the heating wires but alternatively it may not so adhere. The melting or softening of the solder or like coating may be effected, at least in part, by heat from a heated tool used for causing the feed conductors to form arches over the heating wires. Alternatively, or in addition, the melting or softening of the solder or like coating may be effected, at least in part, by the heat generated when the electricity at high frequency is applied between the feed conductors.

The mechanism of the invention is not understood. On the basis of the previously existing knowledge of high-frequency currents it might be expected that the application of electricity a high frequency in the manner herein described would serve no useful purpose and might even be expect to damage the apparatus used to generate the necessary supply of electricity at high frequency. Nevertheless the method is found to be very successful. A number of experiments have been made with a view to elucidating the mechanism of the invention but these have not yet been successful. No change in the connections which are made or improved by the method is visible even when the connections are observed through a microscope while the electricity at high frequency is applied. It is believed that whatever changes do occur must occur very rapidly, probably in a few microseconds. Experiments reveal that heat is generated and it may be that differential expansion momentarily occurs which assists in dispersing the adhesive. It may also be that there is dielectric heating of the adhesive to a temperature sufficient to break down the adhesive and cause it to disperse.

The most suitable frequency of the applied current is best determined by experiment, but it can be stated that a frequency of about 500 kc.s. is often satisfactory. The term high frequency is used herein in its normal sense, that is to any frequency within a range of from about 10 kc.s. to about 1,000 kc.s.

Figure 2:
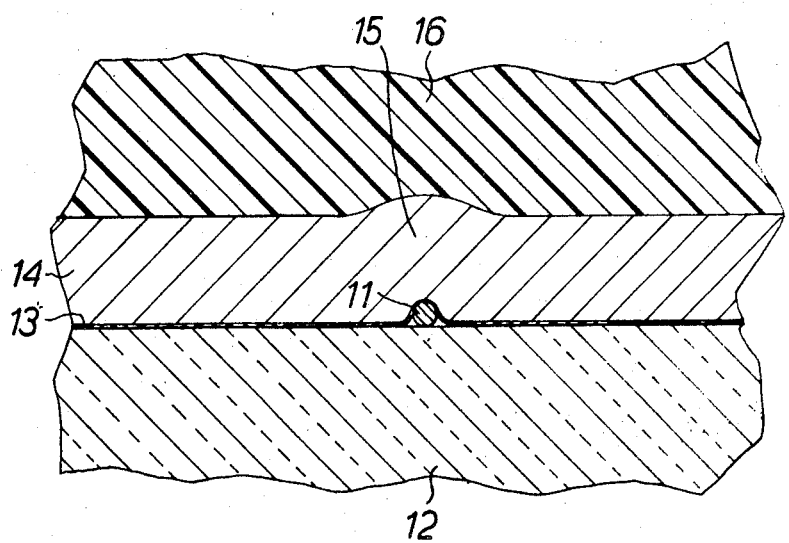

The invention will now be more particularly described with reference to the accompanying drawings, in which:

FIG. 1 is a perspective view of a laminated panel made in accordance with the invention, and FIG. 2 is a cross section, to a much larger scale, through the panel shown in FIG. 1.

The panel 10, shown in FIG. 1, is assembled in a known manner. Uniformly spaced heating wires 11 are first laid on one side of a first sheet of glass 12 and are located by a thin layer of adhesive 13 (see FIG. 2). The wires 11 are made of tungsten and are about 0.0005 in diameter, and the adhesive comprises a poly-vinyl-butyl aldehyde resin which is applied in the form of a spray, the resin having been dissolved in a volatile solvent such as chloroform. As the solvent evaporates the adhesive forms a thin layer 13 over the surface of the glass sheet 12 and over the heating wires 11. Two spaced, parallel feed conductors 14 are laid across the heating wires 11, after they have been located by the adhesive layer 13, the feed conductors 14 being at right angles to the heating wires 11. Each feed conductor 14 comprises a strip of copper coated with tin. Each feed conductor is about 0.003 inches thick and may be about one-eighth or about one-sixteenth of an inch wide.

The feed conductors 14 are located by a thin layer of adhesive (not shown) which is brushed onto them, the adhesive being the same as that described above. The feed conductors 14 are formed into arches, one of which is indicated at 15, over the heating wires by drawing a heated soldering iron along the feed conductors while applying a light pressure. The temperature of the soldering iron is normally insufficient to melt the tin coating on the feed conductors but is sufficient to disperse the adhesive layer 13 under the feed conductors, at least to some extent. If desired the temperature of the soldering iron, and the speed of its travel, may be such that the solder is melted or at least softened. The solder then conforms more closely than before to the shape of the wires 11 over which the feed conductors 14 extend, but it does not adhere to the wires which, being of tungsten, do not adhere to tin. The tungsten wire normally used is coated with graphite which was used as a lubricant when the wire was drawn. The graphite is useful in that it serves to reduce the reflectivity of the wires, but its presence increases the difficulty of making a sound electrical connection by the methods used hitherto. In other forms of panel wires of other materials are used. For example the heating wires may be made of Constantan, an alloy which adheres to tin. (Constantan is an alloy comprising about 40 percent nickel and 60 percent copper).

A sheet of interlayer material 16 is laid over the assembled heating wires 11 and feed conductors 14, and this is topped by a second sheet of glass 17. The sheets 12 and 17 together with the intermediate layer 16 are then laminated together with the aid of heat and pressure in the usual manner. The interlayer material is preferably a poly-vinyl-butyl aldehyde resin similar to that from which the adhesive is made, but it is to be understood that other materials can be used.

There is then effected the principle novel step in the method which is the subject of the present invention. One end 18 of the feed conductor and one end 19 of the other feed conductor are connected electrically to the terminals of a source 20 of alternating electric current at a frequency of about 500 kc./s. for a short period, typically 1½ seconds. It is found that the electrical connection between at least some of the heating wires 11 and the feed conductors 14 is improved by this treatment, and that if there was no connection at all between some of the heating wires and the feed conductors then at least some connections are usually made. There is normally no visible melting or softening of the solder on the feed conductors, but it may be that some melting or softening does occur, particularly when the electricity at high frequency is applied for a longer time.

One particular form of panel, intended for use as a rear window in a motor vehicle, has an electrical resistance between the feed conductors 14 which would be almost exactly 2 ohms if all the contacts between the heating wires and the feed conductors were perfect. In practice it is found that before the electricity at high frequency is applied the resistance may sometimes by considerably higher than this, but that after the application of electricity at high frequency the resistance has been reduced to substantially the theoretical value. Further, whereas some increase in resistance normally occurs when a panel of the known kind has been in use for a period, there is normally no such increase when a panel made by the method in accordance with the invention has been used. It is believed that the previously encountered increase arose from the effects of vibration on the mechanical connection between the heating wires and the feed conductors, but it is not known why this should be cured by the present invention.

It has as yet proved impossible to determine reliably the potentials and currents involved when the electricity at high frequency is applied. Nevertheless it can be stated that satisfactory results have been obtained in treating a panel with an expected resistance of 2 ohms, using apparatus which is capable of producing a maximum output of 500 volts, though it may be necessary to reduce the power output to about three-quarters of the maximum value as by the use of an inductance coil in series with one of the feed conductors. It is believed that the voltage applied between the feed conductors may be between about 200 and 400 volts and that a current of some 60 amps may pass.

We claim:

1. A method of making a laminated panel incorporating heating wires and of the kind comprising first and second rigid sheets and an intermediate layer of a yielding material, the heating wires together with two associated feed conductors being disposed between the first sheet and said intermediate layer, and the heating wires extending in electrical parallel between the two feed conductors, which method includes the steps of placing the heating wires on the first sheet, locating the wires in place with a thin layer of adhesive, placing the two feed conductors across the heating wires and laminating the first and second sheets and the intermediate layer together, the method being characterized in that after the feed conductors have been placed across the heating wires, high-frequency electricity between 10 kc./s. and 1,000 kc./s. and substantially between 200 and 500 volts is applied directly between the two feed conductors to displace the thin layer of adhesive therebetween so as to cause a good electrical connection to be formed between at least some of the heating wires and the feed conductors where a good electrical connection did not previously exist.

2. A method according to claim 1 in which the step of applying electricity at high frequency between the two feed conductors is effected after the step of laminating the first and second sheets and the intermediate layer together.

3. A method according to claim 1 in which the feed conductors are formed into arches over the heating wires before the step of applying electricity at high frequency between the two feed conductors.

4. A method according to claim 3 in which the feed conductors are formed into arches, before the intermediate layer is placed over them, by a suitable tool being passed along each of the feed conductors while pressure is applied by it.

5. A method according to claim 4 including the step of heating the tool as it is passed along each of the feed conductors.

6. A method according to claim 1 in which the electricity at substantially 5000kc./s. is applied for substantially ½ seconds.

7. A method according to claim 1 in which the intermediate layer comprises a sheet of a poly-vinyl-butyl aldehyde resin and in which the adhesive comprises similar material which is dissolved in a volatile solvent to form a solution which is applied as a spray.

8. A method according to claim 1 in which the heating wires comprise lengths of tungsten wire 0.0005 inches in diameter.

9. A method according to claim 1 in which the design resistance of the laminated panel is 2 ohms and the high frequency is applied by apparatus capable of giving a maximum output of 500 volts.

* * * * *